US006606874B1

(12) United States Patent
Bühring et al.

(10) Patent No.: US 6,606,874 B1
(45) Date of Patent: Aug. 19, 2003

(54) VENTILATION ARRANGEMENT FOR BUILDINGS

(75) Inventors: Andreas Bühring, Freiburg (DE); Pedro Da Silva, Gerlingen (DE)

(73) Assignee: Fraunhofer-Gesellschaft zur Forderung der angewandten Forshung e.V., Munich (DE)

(*) Notice: Subject to any disclaimer, the term of this patent is extended or adjusted under 35 U.S.C. 154(b) by 0 days.

(21) Appl. No.: 09/831,159
(22) PCT Filed: Nov. 23, 1999
(86) PCT No.: PCT/EP99/09047
§ 371 (c)(1),
(2), (4) Date: Jul. 19, 2001
(87) PCT Pub. No.: WO00/32994
PCT Pub. Date: Jun. 8, 2000

(30) Foreign Application Priority Data

| Nov. 30, 1998 | (DE) | ......................................... 198 61 020 |
| Jan. 19, 1999 | (DE) | ......................................... 199 01 871 |

(51) Int. Cl.$^7$ .............................. F25F 5/00; F25F 13/00
(52) U.S. Cl. ..................................... 62/238.7; 62/324.1
(58) Field of Search ............................. 62/238.7, 238.6, 62/180, 181, 183, 184, 324.1, 324.6, 325

(56) References Cited

U.S. PATENT DOCUMENTS

| 2,575,325 | A | * | 11/1951 | Ambrose et al. | ...... 62/238.6 X |
| 4,399,664 | A | * | 8/1983 | Derosier | ..................... 62/238.7 |
| 4,924,681 | A | * | 5/1990 | Devit et al. | ................. 62/238.6 |
| 5,050,394 | A | * | 9/1991 | Duley et al. | ................... 62/115 |
| 5,348,077 | A | * | 9/1994 | Hillman | ..................... 62/325 X |
| 6,038,879 | A | * | 3/2000 | Turcotte et al. | ................ 62/325 |

FOREIGN PATENT DOCUMENTS

| DE | 3635425 | * | 4/1987 | |
| GB | 2052712 | * | 1/1981 | ................ 62/238.7 |
| GB | 2168136 | * | 6/1986 | |

* cited by examiner

*Primary Examiner*—Harry B. Tanner
(74) *Attorney, Agent, or Firm*—Antonelli, Terry, Stout & Kraus, LLP

(57) ABSTRACT

Disclosed is a ventilation arrangement for buildings with heat removal from an exhaust-air flow ($L_{Ab}$) discharged from the building and/or from a fresh-air flow ($L_{zu}$) supplied to the building, the arrangement having a heat pump which has a coolant/water heat exchanger (WW) with a mass flow controlled by the water system and having a coolant/air heat exchanger ($LW_{zu}$, $LW_{Ab}$) serving the fresh-air flow ($L_{zu}$) and the exhaust-air flow ($L_{Ab}$), the coolant/air heat exchanger ($LW_{zu}$, $LW_{Ab}$) being connectable in series to the coolant/water heat exchanger (WW).

21 Claims, 6 Drawing Sheets

VENTILATION ARRANGEMENT FOR BUILDINGS

STATE OF THE ART

In the future, more heat-recovery ventilation devices will be installed in new apartment buildings, which will lead to greater comfort, because they ensure automatic required air exchange and heat recovery which distinctly raises the temperature of the fresh air. Moisture in the living quarters is continually removed, which prevents damage to the buildings from moisture. Utilizing the exhaust air to preheat the fresh air can lower heat requirements and in this way save energy. For this reason, these systems are granted a bonus status in present heat protection regulations and with all probability new energy saving regulations will do so as well.

If such a ventilation system is combined with a ground heat exchanger to preheat fresh air, the temperature of the exhaust air is of a magnitude, even after discharging heat to the fresh air, which permits energy-efficient use by a heat pump. The heat pump can discharge recovered heat into the fresh air in conjunction with the converted-into-heat drive energy when heat is required and otherwise stand at disposal for heating drinking water.

In a low energy house, it can cover a substantial part of the heat requirements. Outside the core heating period, the exhaust air heat pump can cover warm water preparation fully. In combination with a thermal solar system, it increases energy efficiency.

In a passive house, the described combination of devices can cover all heat requirements entirely. Elimination of the still necessary auxiliary heating system in a low-energy house reduces investment in building technology.

The heating requirements for heating domestic-use water in a low-energy house may amount from 30% to 50% of the overall heating requirement and even dominate in a passive house. Heating the water by means of the heat pump requires higher temperatures than for heating fresh air, thereby generally lowering the efficiency of the heat pump (performance number).

Moreover, for better summer comfort, frequent cooling of the living quarters is desirable. Increasing sales of usually less efficient room-cooling devices is evidence of this general demand.

There are various approaches to realize utilizing heat at varying temperatures. Fundamentally, two liquefiers are connected in such a manner that a coolant flows through them in series. However, if only one of the two types of heating requirements is needed (heating the air or heating the domestic-use water), either one liquefier is circumvented by a bypass or heat is discharged, although undesired, at a location where it is not needed. If this heat loss is to be prevented and if it is also required that the heat pump be operable in a cooling circuit while, if possible, heating domestic-use water as well, very complicated and therefore expensive circuits that are susceptible to malfunction have hitherto been realized.

DESCRIPTION OF THE INVENTION

The present invention provides a ventilation arrangement for buildings in such a manner that the aforedescribed, partly dominating heating requirements are met with greater performance numbers and greater warm water comfort, while permitting easy combination with a varying buffer storage for thermal solar systems. In addition to this, the invention allows cooling living quarters for greater summer comfort. Finally, the ventilation arrangement provides inexpensive manufacturing and operating as well as being reliable.

The solution thereto is a ventilation arrangement for buildings with heat removal from an exhaust-air flow ($L_{Ab\,(off)}$) discharged from the building and/or from a fresh-air flow ($L_{zu(on)}$) supplied to the building, the arrangement having a heat pump which has a coolant/water heat exchanger (WW) with a mass flow controlled by a water system and having a coolant/air heat exchanger ($LW_{ZU}$, $LW_{Ab}$) serving the fresh-air flow ($L_{zu}$) and the exhaust-air flow ($L_{Ab}$) the coolant/air heat exchanger ($LW_{zu}$, $LW_{Ab}$) being connectable in series to the coolant/water heat exchanger (WW).

BRIEF DESCRIPTION OF THE DRAWINGS

The present invention is made more apparent In the following without the intention of limiting the scope or spirit of the overall invention using preferred embodiments with reference to the accompanying drawings, showing in.

WAYS TO REALIZE THE INVENTION, COMMERCIAL APPLICABILITY

Figure 1:
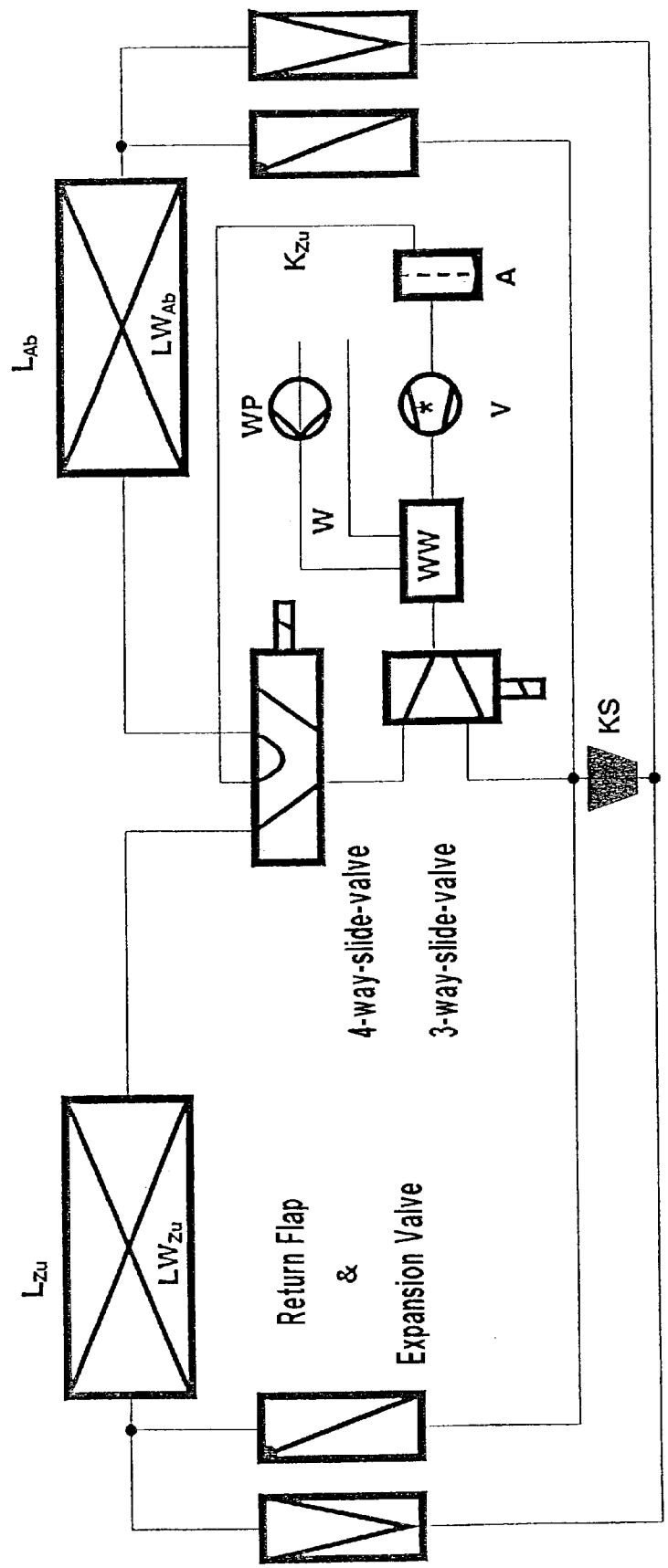
FIG. 1 is a basic diagram of the ventilation arrangement

A very simple circuit which meets all the aforementioned requirements is shown in FIG. 1. The core piece of the serial connection is a coolant/water heat exchanger WW with a controlled mass flow W in the water system and a coolant/air heat exchanger $LW_{zu}$ or $LW_{Ab}$, for which a bypass is provided. The water pump WP permits easy control of withdrawing heat from the coolant, If warm water is required but no heat energy, the pump WP is driven at nominal speed with the heat being removed from the coolant to the point of undercooling and the liquid coolant flows into the coolant collector KS. In a skillfully designed construction, the three-way valve can be replaced with a simple magnetic valve.

However, if only heat and no warm water is required, the pump WP is switched off. In this event, only the contents of heat exchanger WW warms up without discharging heat to the domestic-use water cycle W. If it is disposed in the fresh air~ its heat discharge serves solely to heat the fresh air as desired.

However, if both heating requirements are needed at the same time, the water pump WP can be operated at lower speed than the nominal speed thereby conveying some of the heat to the water and the remainder goes to the fresh air.

There are two possible ways to control the pump:

If a speed-controlled pump with a preceding inverter is employed, the flow can be controlled continuously. With a temperature sensor at the water outlet of the heat exchanger, a defined outlet water temperature can be set within large operational limits. Major domestic-use water comfort can be obtained, because water of desired temperature can be made quickly available in a warm-water storage. Immediate availability of the desired end temperature obviates a buffer storage concept on a loading lance. The relatively high price of the controlled pump, the inverter and the sensor has to be taken into consideration. Moreover, the inverter should be as small as possible or at least be of minimal stand-by-current consumption.

It would be simpler to use an alternative-current pump and a pump drive with phase control or with pulse-width modulation.

A two-step pump permits setting a defined mass-water flow for mixed operation. Utilizing the marked difference in heat exchange capacity in the laminar flow and the turbulent flow of water in the heat exchanger, the speed difference can be limited. This concept has the advantage that control is very simple and inexpensive. However, it cannot ensure the aforedescribed comfort.

Another alternative for mass-flow control of the mass flow flowing through the heat exchanger is utilizing the buoyancy of the heated water inside the heat exchanger. The thermal buoyancy of the heated water inside the heat exchanger permits automatic charging of the buffer storage without requiring supplementary energy. Although this requires matching the design of the ventilation device to the design of the heat pump and a solar storage, the performance number of heating the water can be considerably increased by obviating auxiliary energy.

Due to the low density of the heated water, it flows through a charging device, preferably a laminated lance with a charge opening at several heights, until it reaches a level with the same temperature as in the storage. This principle is employed in thermosyphon solar collectors (standard in the Mediterranean) and previously in gravity heating.

With the aid of the tour-way valve also depicted in FIG. 1, the function of the liquefier in the air and function of the evaporator can be exchanged. In this way, the fresh air can be employed as a source of heat for domestic-use water if cooling is desired in the summer, yielding thereby a twofold use of the applied electric drive energy.

If, however, no warm water is needed, because the warm-water storage, e.g. has already been heated by a thermal solar system, the excess heat can also be discharged in the exhaust air. In this case, use is only for cooling, which should be rarely employed if energy is to be used efficiently. Therefore, it is important to design the building well and to predominantly employ, if possible, a ground-heat exchanger for cooling fresh air.

Figure 2:
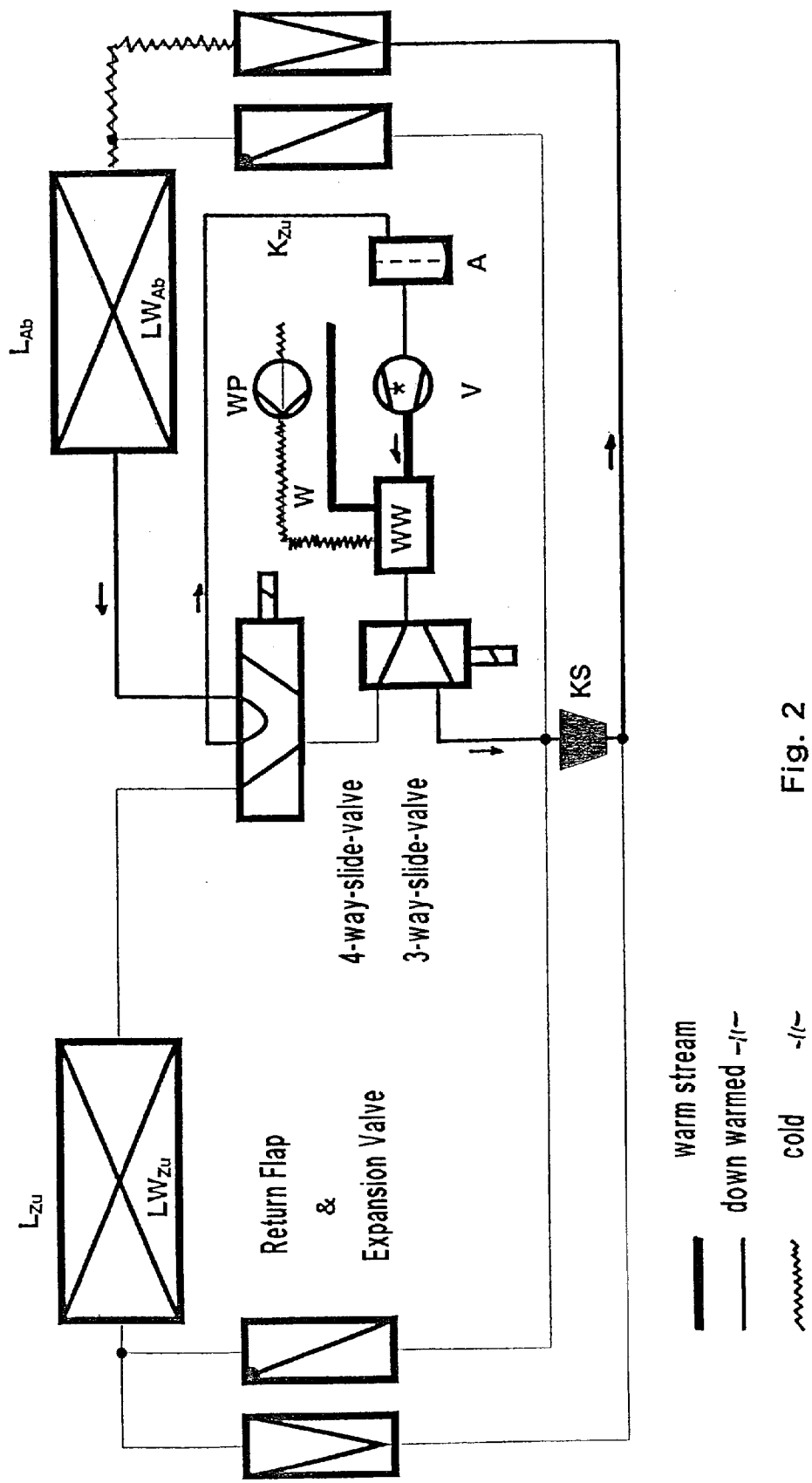
FIG. 2 is a ventilation arrangement for domestic-use water operation.

FIG. 2 shows operation of the heat pump for domestic-use water operation. The water pump WP runs at the highest speed so that the entire deheating, condensation and undercoating occurs in the coolant/water heat exchanger WW. The three-way valve opens the bypass to the coolant collector. The arrows in the conduits indicate the direction of the coolant-mass flow.

The mass flow cycle is as follows:

The water pump WP conveys cold water into the heat exchanger WW, where the domestic-use water W is heated. Overheated coolant $K_{zu}$ coming from the heat exchanger $L_{Ab}$ via the four-way valve and separator A flows through the WW from the compressor V. The cooled coolant reaches the coolant collector KS from the heat exchanger WW via the three-way valve and is liquefied by means of an expansion valve and cooled. A cold coolant-liquid flow reaches the exhaust air heat exchanger $LW_{Ab}$.

FIG. 2 contains a legend indicating the temperature of the different mass flows. The thick line stands for a warm mass flow, the normal line a cooled off mass flow and the zigzag line a cold mass flow. This also applies in the other figures.

Figure 3:
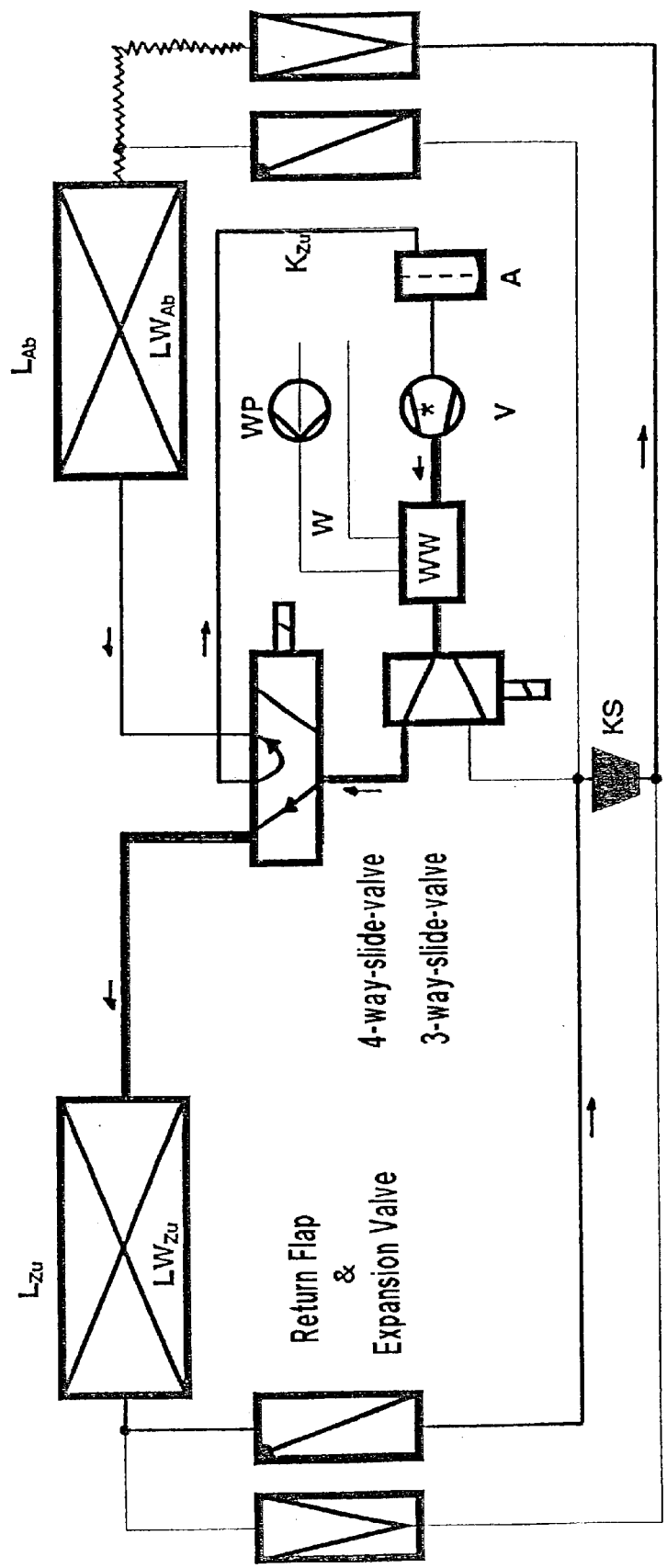
FIG. 3 is a ventilation arrangement for fresh air heating operation.

FIG. 3 shows a sketch of solely fresh air heating. For this purpose, the water pump WP is switched off and the three-way valve opens the connection to the inlet of the four-way valve.

The mass-flow cycle in FIG. 3 is a follows:

The coolant coming from the heat exchanger $LW_{Ab}$ via the four-way valve and the separator flows overheated by means of the compressor through WW. From the heat exchanger WW, the overheated coolant reaches the air heat exchanger $LW_{zu}$ unaltered via the three-way valve and the four-way valve. In the air heat exchanger $LW_{zu}$ the fresh air is heated and the coolant-mass flow flowing in the conduit is liquefied. The cooled-off flow reaches the coolant collector KS via a return flap and the exhaust-air heat exchanger $LW_{Ab}$ again via an expansion valve.

Figure 4:
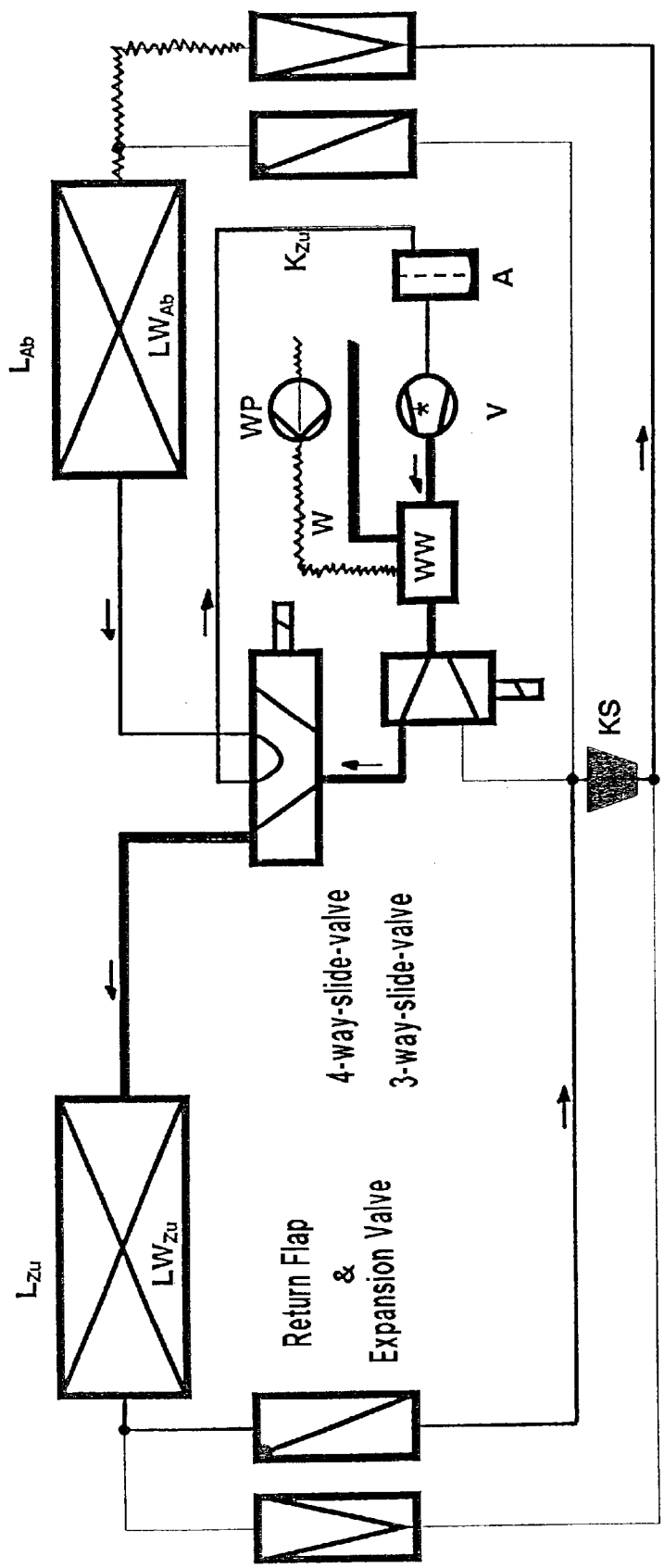
FIG. 4 is a ventilation arrangement for heating domestic-use water and fresh air.

FIG. 4 shows simultaneous water heating and air heating: due to low-speed operation of the water pump WP, with the same valve setting as in the fresh-air heating operation in FIG. 3, a part of the heat is discharged to the water. If a speed-controlled water pump is employed, the water exit temperature from the heat exchanger can be set at the desired temperature.

Figure 5:
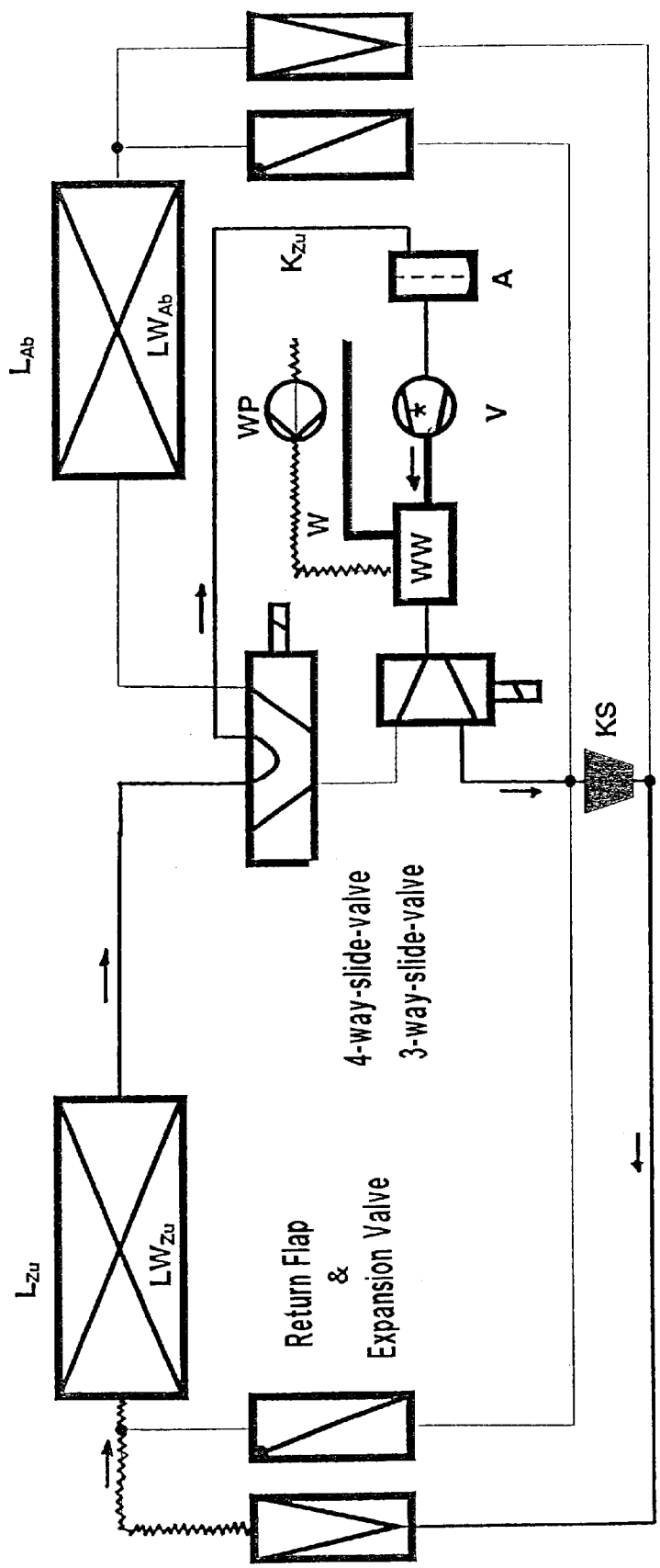
FIG. 5 is a ventilation arrangement for cooling operation and simultaneously heating water.

FIG. 5 shows cooling operation with simultaneous water heating:

If the warm water requirements in summer cannot be adequately covered by a thermal solar system, the heat of the fresh air can be withdrawn by means of switching the four-way valve and simultaneously thereby providing comfort by cooling the living quarters.

The overheated coolant flows through the heat exchanger WW, whose heat is discharged to the water W. The heat-discharging coolant reaches via the coolant collector the expansion valve, where the cooling process occurs. The cold mass flow withdraws heat from the fresh air in the air heat exchanger $LW_{zu}$ thereby cooling it. The heated coolant flow emerging from the air heat exchanger $LW_{zu}$ reaches the compressor again via the four-way valve and the separator.

Figure 6:
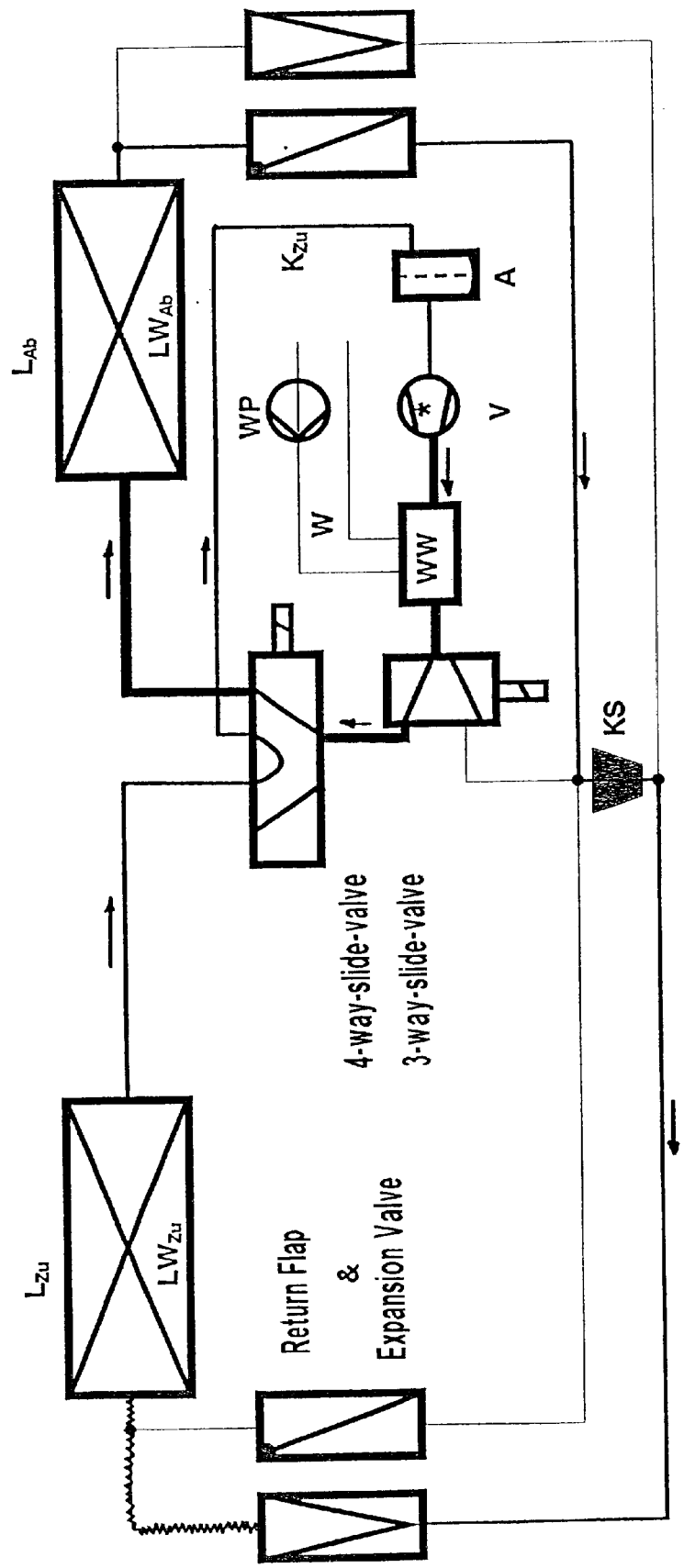
FIG. 6 is a ventilation arrangement for cooling fresh air white discharging the excess heat into the exhaust air.

FIG. 6 shows a ventilation arrangement for cooling the fresh air by discharging excess heat to the escaping air. This circuit arrangement is suited for the thawing operation of the evaporator.

In the described circuit, the heat pump is also suited for solely cooling the ventilated rooms. If the water storage has reached a maximum temperature, the three-way valve switches to coolant/air heat exchanger for the exhaust air $L_{Ab}$. However, as a result the heat at disposal is in general no longer of any use. This situation should happen as seldom as possible. However, it offers the inhabitants greater thermal comfort on especially hot days and is more efficient than simple split-cooling devices which might otherwise be employed.

The circuit can also be used to thaw the evaporator $LW_{Ab}$ in winter operation in one of the three first cases. In this event, the surface of the frost-covered respectively ice-coated evaporator is actively heated in the moist exhaust air of the heat pump. For this purpose, the enthalpy of solidification of the frozen water has to be furnished. Then the liquid water flows off via the drain so that the enthalpy of evaporation previously removed from the water vapor present in the exhaust air is retained as recovered heat.

The heat for thawing is made available with the performance number of the heat pump. For this purpose, the fresh air is briefly cooled. The heat pump can subsequently compensate this energy with a corresponding performance number of heat preparation. In this way this thawing process is energetically superior to direct-electrical thawing or bypass-heat thawing.

Depending on the layout of the control signals, this process takes three to six minutes. During this time, uncomfortable fresh air temperatures must not occur in the ventilated rooms. For a yet to-be-tested period of time, the thermal storage mass of the fresh-air system of the ventilation device and of the air circulation network will ensure raising the temperature to at least 17° C.

This period of time must not be exceeded in the thawing process. Otherwise the heat pump requires a certain time after thawing until the performance numbers of the constant operation are restored. Optimization of the layout of the heat pump is to be conducted between these two goals.

What is claimed is:

1. A ventilation arrangement for a building with heat removal from an exhaust-air flow discharged from the building and a fresh-air flow supplied to the building, comprising:
    a heat pump including a coolant/water heat exchanger, a coolant/air heat exchanger serving the exhaust air flow and a coolant/air heat exchanger serving the fresh-air flow; and wherein
        the coolant/water heat exchanger is provided on a water side of the heat pump with a controllable mass flow of water and the coolant/air heat exchangers are each connectable in series to the coolant/water heat exchanger to receive the controllable mass flow of water.

2. A ventilation arrangement according to claim 1, wherein:
    the mass-flow control occurs with a water pump which conveys water-mass flow to the coolant/water heat exchanger with a speed control of the water pump which varies the mass flow in speed from stopping to a maximum speed providing a maximum water conveying capacity.

3. A ventilation arrangement according to claim 2, wherein:
    the mass-flow control is variable from a laminar to a turbulent water flow inside the heat exchanger.

4. A ventilation arrangement according to claim 2, wherein:
    the mass-flow control is with speed-control of the water pump which provides a water flow variable from a laminar to a turbulent water flow inside the heat exchanger.

5. A ventilation arrangement according to claim 1, wherein:
    the mass-flow control uses buoyancy of heated water in the heat exchanger.

6. A ventilation arrangement according to claim 1, wherein:
    the coolant/water heat exchanger comprises a water supply line provided with a compressor.

7. A ventilation arrangement according to claim 6, wherein:
    the coolant supply line is connected with the coolant/air heat exchanger for the exhaust air and the coolant supply line contains a heated gaseous coolant coming from the coolant/air heat exchanger operating as a compressor, which is connected to the coolant/water heat exchanger.

8. A ventilation arrangement according to claim 6, wherein:
    the coolant supply line is connected with the coolant/air heat exchanger for the exhaust air and the coolant supply line contains a heated gaseous coolant coming from the coolant/air heat exchanger operating as a compressor, which is connected with the coolant/air heat exchanger operating as a liquefier for the fresh-air flow and the coolant/air heat exchanger is connected with the coolant/water heat exchanger.

9. A ventilation arrangement according to claim 6, wherein:
    the coolant supply line is connected with the coolant/air heat exchanger for the fresh-air flow and the coolant supply line contains a heated gaseous coolant coming from the coolant/air heat exchanger operating as an evaporator which is connected with the coolant/water heat exchanger.

10. A ventilation arrangement according to claim 6, wherein:
    the coolant supply line is connected with the coolant/air heat exchanger for the fresh-air flow and the coolant supply line contains a heated gaseous coolant coming from the coolant/air heat exchanger operating as an evaporator, which is connected with the coolant/air heat exchanger operating as a liquefier for the exhaust air, with the coolant/air heat exchanger connected With the coolant/water heat exchanger.

11. A ventilation arrangement according to claim 7, wherein:
    the coolant supply line is connectable with the coolant/air heat exchanger or via a four-way valve.

12. A ventilation arrangement according to claim 8, wherein:
    the coolant supply line is connectable with the coolant/air heat exchanger or via a four-way valve.

13. A ventilation arrangement according to claim 9, wherein:
    the coolant supply line is connectable with the coolant/air heat exchanger or via a four-way valve.

14. A ventilation arrangement according to claim 10, wherein:
    the coolant supply line is connectable with the coolant/air heat exchanger or via a four-way valve.

15. A ventilation arrangement according to claim 1, wherein:
    the coolant/water heat exchanger is connectable with the coolant collector with one of a three-way valve or a four-way valve and is connectable with the coolant/air heat exchangers or with the four-way valve.

16. A use of the ventilation arrangement according to claim 7 for heating water mass flow, with heat from the exhaust air flow being conveyed inside the coolant/air heat exchanger to the coolant by evaporating the coolant and the gaseous coolant is subsequently conveyed to the compressor through which the coolant is subjected to heating by means of compression and heat from the compressor is at least partly discharged to the water-mass flow in the coolant/water heat exchanger.

17. A use of a ventilation arrangement according to claim 8 for heating the fresh-air flow, with a heat conveying capacity of the water pump being operated at a lower capacity than a maximum capacity and with heat from the exhaust-air flow being conveyed to the coolant inside the coolant/air heat exchanger by evaporating the coolant and the gaseous coolant is subsequently conveyed to the compressor which subjects the coolant to heating by means of compression therein and from which the heated gaseous coolant is conveyed to the coolant/air heat exchanger operating as a liquefier by means of which the fresh-air flow is heated.

18. A use according to claim 17, including simultaneous heating of the water mass flow by operating the water pump, with a part of heat from the heated, gaseous coolant inside the coolant/water heat exchanger being discharged to the water-mass flow with a lower conveying capacity than a maximum capacity.

19. A use of a ventilation arrangement according to claim 9 for cooling the fresh-air flow, by removing heat from the fresh air with the coolant which is conveyed in liquid form to the coolant/air heat exchanger operating as an evaporator.

20. A use according to claim 19 including simultaneously heating of the water-mass flow by means of conveying the heated, evaporated, gaseous coolant to the coolant/water heat exchanger with the water pump conveying water through the coolant/water heat exchanger.

21. A use according to claim 19 including simultaneous heating of the exhaust-air flow for selective thawing of the coolant/air heat exchanger, by conveying the heated, evaporated, gaseous coolant to the coolant/air heat exchanger operating as a liquefier.

* * * * *